United States Patent [19]

Middleton

[11] Patent Number: 4,568,000
[45] Date of Patent: Feb. 4, 1986

[54] LAMINATE WEB PRODUCED WITH POLYACRYLIC ACID COMPLEX PRIMER

[75] Inventor: Scott W. Middleton, Appleton, Wis.

[73] Assignee: American Can Company, Greenwich, Conn.

[21] Appl. No.: 659,037

[22] Filed: Oct. 10, 1984

Related U.S. Application Data

[63] Continuation of Ser. No. 552,851, Nov. 16, 1983, abandoned, which is a continuation of Ser. No. 340,468, Jan. 18, 1982, abandoned.

[51] Int. Cl.[4] .............................................. B65D 35/10
[52] U.S. Cl. ..................... 222/707; 428/35; 428/461; 156/218; 427/374.1
[58] Field of Search ........................ 428/35, 461, 463; 222/92, 107; 156/218; 427/374.1

[56] References Cited

U.S. PATENT DOCUMENTS

| | | | |
|---|---|---|---|
| 3,347,419 | 10/1967 | Brandt et al. | 222/107 |
| 3,505,143 | 4/1970 | Haas et al. | 222/107 |
| 3,900,689 | 8/1975 | Deyrup | 428/461 |
| 4,092,452 | 5/1978 | Hori et al. | 428/461 |
| 4,172,915 | 10/1979 | Sheptak et al. | 428/461 |
| 4,196,825 | 4/1980 | Kincaid | 156/218 |
| 4,257,536 | 3/1981 | Hilmar | 222/107 |

*Primary Examiner*—Alexander S. Thomas
*Attorney, Agent, or Firm*—Stuart S. Bowie; Douglas W. Wyatt

[57] ABSTRACT

A laminate web, suitable for conversion into a container for degenerative products, is produced from aluminum foil and an extrusion coating of an ethylene/acrylic acid-type copolymer, utilizing a polyacrylic acid chromium complex primer to enhance the bond at the interface. The laminate web will usually be formed into a tube with the copolymer disposed on the product side, which can advantageously be used to package fluoride toothpaste, and the like.

17 Claims, No Drawings

LAMINATE WEB PRODUCED WITH POLYACRYLIC ACID COMPLEX PRIMER

This application is a continuation of Ser. No. 552,851 filed Nov. 16, 1983, abandoned, which is a continuation of Ser. No. 340,468 filed Jan. 18, 1982, abandoned.

BACKGROUND OF THE INVENTION

Tubes and other containers made of laminated webs, that are in turn fabricated from a metal foil and layers of synthetic resinous materials, are widely used for the packaging of a variety of products, such as toothpaste and the like; American Can Company, of Greenwich, Connecticut, markets such tubular containers under its GLAMINATE trademark. By properly designing and constructing the laminate, the oxygen and moisture barrier properties necessary for the containment of many commodities are afforded, as are the heat sealability and dead fold characteristics that are desirable in a tube-like package. Typically, the product side of the laminate web will comprise an olefinic polymer, such as low density polyethylene, ethylene-acrylic acid copolymer (EAA) or Surlyn ionomer, bonded to the inner surface of the metal layer, which is normally aluminum foil.

Although containers so constructed are entirely satisfactory under most circumstances, the ingredients of certain products have a tendency to degrade or otherwise attack the materials of construction, causing failure of the container. Certain dentifrice products are notoriously difficult to package in such a laminate web structure, particularly those that contain stannous or sodium fluoride as an anticaries agent. Due to the acid environment and/or the essential flavoring oils and detergents that are present, there is a strong tendency for ingredients of the toothpast to permeate the inner plastic layer, and to migrate to the interface, thereby promoting delamination in the web structure and causing deterioration of the contained product. Of course, the longer the period of storage the more pronounced will be the tendency for degeneration to occur in the laminate web, and particularly so if the packaged is stored at a relatively elevated temperature.

Various measures have been in the past not only to enhance the initial level of adhesion achieved between the plastic film and the foil, but also to improve resistance to delamination over extended storage periods, i.e., to extend shelf life. These efforts include flame treatment of the foil, the utilization of interlayers of various adhesive materials, and chemical priming of the metal to increase the strength of the bond at the interface. A notable example of the latter approach entails the utilization of a polyacrylic acid chromium complex product as a foil primer to promote adhesion to polyethylene; laminate structures so produced have been used for the packaging of alcohol-saturated swabs. While the utilization of such a primer is seen to significantly enhance bond strength, still it is not entirely satisfactory on long-term storage, and the use of polyethylene as the product-side layer may be undesirable in some instances, due to the tendency of that material to show environmental stress cracking in the presence of certain products, such as toothpaste.

Accordingly, it is a primary object of the present invention to provide a novel laminate web comprised of aluminum foil and a layer of a copolymer of ethylene with an acrylic acid or acrylic acid ester monomer, which web is adapted for use to contain degenerative products for extended periods of time.

It is also an object of the invention to provide a novel container and package fabricated from such a laminate web.

Additional objects of the invention are to provide novel methods for the production of such webs, containers and packages.

SUMMARY OF THE INVENTION

It has now been found that certain of the foregoing and related objects of the invention are readily attained by the provision of a laminate web comprising aluminum foil, a film of a copolymer of ethylene having in its molecule pendant carboxylic acid or ester groups, and a layer of a polyacrylic acid chromium complex primer therebetween. In preferred embodiments of the web, the copolymer of the film will be selected from the group consisting of poly(ethylene/acrylic acid), poly(ethylene/methacrylic acid), poly(ethylene/methylacrylate), poly(ethylene/ methyl methacrylate), poly(ethylene/vinyl acetate), and ionomer resins. The primer coating will be of at least monomolecular thickness, and the web will generally comprise at least one additional layer; normally it will include at least one synthetic resinous polymer layer disposed upon the side of the foil opposite to that upon which the primer is applied.

Other objects of the invention are attained by the practice of a method for the production of a laminate web, wherein at least a monomolecular layer of a polyacrylic acid chromium complex primer, formulated as an aqueous alcoholic solution, is deposited upon at least one side of an aluminum foil substrate. The coated substrate is thereafter heated to substantially dry the primer, following which a film of a copolymer of ethylene (as described above) is extrusion coated upon the primed surface; the laminate is cooled to provide the finished web. Preferably, in the extrusion coating step, the copolymer melt will have a temperature of about 550° to 600° Fahrenheit, and most desirably its temperature will be at about 575° to 590° Fahrenheit.

Additional objects of the invention are realized by the provision of a container for a degenerative product, which container is fabricated from a laminate web constructed as described, and having the copolymer film disposed on the product side thereof. Other objects are obtained in such a container filled with a degenerative product, maximum benefit in this regard often being realized when the contained product is a dentrifice substance containing a fluoride anticaries agent and/or one or more essential oils. Usually, such a container will be in the form of a tube, with the laminate web constituting the sidewall and with a headpiece bonded within one end of the tubular structure; the headpiece will generally be made of a polyolefin resin, such as high density polyethylene. Still further objects of the invention are attained in a method for the production of a container, and in a packaging method utilizing the same, in accordance with which the above-described laminate web is formed into a container structure with the copolymer film disposed on the inside surface, and the container being filled with a degenerative product.

DETAILED DESCRIPTION OF THE PREFERRED EMBODIMENTS

As noted initially, foil/ethylene copolymer laminate webs have previously been used for container fabrication. The present invention provides means by which the strength of the bond between the foil and the copolymer layer on the product side is greatly enhanced, and is rendered substantially less susceptible to degenerative ingredients that may migrate to the interface.

The chrome complexes that are utilized to prime the aluminum foil surface are commercially available from the Mica Corporation, of Stamford, Connecticut, under the trade designation MICA A-291, which is a seven percent aqueous solution of a polyacrylic acid chromium complex; it is acidic in nature and has a viscosity of about ten centipoise. The MICA A-291 product literature indicates use for bonding polyethylene to aluminum foil, for packaging and industrial applications requiring high bonds and resistance to a variety of hard-to-hold materials, including fluorides and essential oils. It is not believed, however, that there has heretofore been any recognition that the use of such a primer will achieve the results attained by the instant process; i.e., the development of extremely durable bonds between aluminum foil and extrusion coatings of carboxcylic acid or ester-containing copolymers of ethylene, which bonds endure despite intimate contact with products considered to be of a highly degenerative nature.

Although the above-identified chromium complex is believed to be the most effective primer for use herein, other closely-related substances may be substituted if so desired. Thus, the length of the polyacrylic acid chain may vary, as may the proportion of the acrylic acid moiety in the copolymer and the ratio of the metal to the organic portion of the complex. Indeed, it is possible that other transition metals, such as cobalt, copper, nickel, and the like, might be substituted for the chrome ion.

As indicated above, the primer will generally be applied as a dilute water/alcohol solution, to maximize leveling and wetting of the substrate, and thereby afford optimal levels of adhesion of the polymer layer thereto. To prepare the working liquid, the commercial MICA A-291 product may suitably be mixed with additional water and isopropyl alcohol in a volumetric ratio of 30: 60: 10, respectively.

The resulting solution will be used in an amount sufficient to provide, when dried, about 0.03 to 0.08, and preferably about 0.035, pound of complex solids per ream (i.e., 3,000 square feet of surface area). In any event, the primer must be of at least monomolecular thickness, and generally it will be at least somewhat heavier. After drying of the primer, typically by passage of the foil structure through an oven held at a suitable temperature, (i.e., about 250° to 400° Fahrenheit), the web may be presented directly to a copolymer extrusion station; at that point, its temperature will generally be about 100° to 150° Fahrenheit.

The techniques utilized for extrusion coating of the ethylene copolymer upon the aluminum foil are well known to those skilled in the art, and need not be discussed in detail. It should, however, be appreciated that the temperature of the melt is critical to the attainment of optimal bonding, bearing in mind that the copolymer must not only be strongly adhered to the foil, but that its capacity for self-bonding (i.e., for heat sealing) and for bonding to other portions of the ultimate container must also be preserved. Specifically, and as has been pointed out above, the laminate webs of the invention will find their widest utility in the production of tubular containers, for which applications the web must be capable of side seaming and secure attachment to the molded headpiece. High melt temperatures favor bonding to the foil; on the other hand, they also promote oxidation, which inhibits the formation of good bonds with other polymeric surfaces (e.g., the headpiece). Consequently (and depending to an extent upon the air gap distance beyond the extruder die lips), EAA will generally be extruded, in the practice of the present method, at a temperature of 550° to 600° Fahrenheit, and an optimum balance of bonding properties will usually be realized with a melt temperature of about 575° to 590° Fahrenheit.

While EAA or ionomer will usually constitute the product-side layer in the laminate web, other copolymers of ethylene having pendant carboxylic acid or ester groups can also be used, such as copolymers with acrylic or methacrylic acids, methylacrylate, methylmethacrylate, and vinyl acetate. The techique normally used to produce the foil/copolymer composite will be extrusion coating in view of the recognized economic and practical benefits of doing so; however, other techniques may be found to be feasible under certain circumstances, and may be employed if so desired. Generally, the thickness of the product-side polymer will range from about 1.0 to 4.0, and more commonly 1.5 to 3.0, mils, to provide an optimal functional and economic balance.

Insofar as the foil component is concerned, as a practical matter thin-gauge (i.e., about 0.285 to 3.0 mils) aluminum will normally be utilized, although for certain applications foils of other metals might be substituted. The laminate web will generally contain additional polymer layers for various purposes, and a paper layer will usually be included to enable facile printing or decoration of the article. A typical laminate profile will comprise (from the outside in): polyethylene, paper, polyethylene, EAA, foil, primer, and EAA, which structure is (save for the foil, primer, EAA subcombination) conventional and not an essential aspect of the present invention. Similarly, the manner in which the laminate web is converted into the container (e.g., head bonding, side seaming, and end sealing to form and close a tube) may be entirely conventional and known to those skilled in the art; accordingly, detailed description is unnecessary. It might be mentioned, however, that in forming the side seam it is common practice to overlap the edges of the web.

Since this will expose both sides of the laminate to the product, advantage can be seen in priming both surfaces of the foil, in accordance herewith.

Exemplary of the efficacy of the present invention are the following specific examples:

EXAMPLE ONE

Webs are produced utilizing a laminate subassembly comprised of layers of polymers and paper bonded to 0.7 mil of aluminum foil, the overall gauge of the subassembly being about 10.2 mils. The exposed side of the foil is primed by applying, from a rotogravure cylinder, somewhat in excess of a monomolecular layer of a polyacrylic acid chromium complex, using a 30: 60: 10 solution of MICA A-291: water: isopropyl alcohol, which is subsequently forced air dried in an oven, at about 250° Fahrenheit.

A first laminate is produced by extrusion coating the primed foil surface with 43.5 pounds per ream of low density polyethylene, the extrudate being at a temperature of about 600° Fahrenheit; the laminate is designated "A". A second laminate, designated "B", is prepared by extrusion coating the subassembly with the same thickness of an EAA copolymer containing 3.5 percent of the acrylic acid monomer, the temperature of the melt also being about 600° Fahrenheit; a third web (laminate "C"), is prepared in the same manner utilizing, in place of the 3.5 percent resin, an EAA copolymer containing 8.0 percent of the acrylic acid moiety.

The foregoing laminates are converted to small pillows measuring 1×5⅝ inches, which are filed with a commercial dentifrice product (i.e., Proctor & Gamble CREST toothpaste), and are thereafter sealed. Several pillows produced from each of the three laminates are held at a controlled temperature for periods of from two weeks to six months, after which the condition of the web is determined. Specifically, five pillows of each sample are held at temperatures of 75° and 105° Fahrenheit, and three pillows of each sample are held at a temperature of 120° Fahrenheit; they are evaluated at intervals of two, four, eight, twelve, and twenty-six weeks. The results are set forth in Table One, which follows:

Two versions of each laminate are produced; i.e., both with and without pretreatment of the foil with the MICA A-291 primer. The pouches are sealed and stored at a temperature of 105° Fahrenheit, different ones being opened after one and two months' storage time to assess the levels of adhesion that are maintained between the polymer layer and the foil.

After storage for one month, the webs made with the primed aluminum show good adhesion regardless of whether the polymer layer is comprised of EAA or ionomer. The unprimed aluminum, on the other hand, produces webs in which delamination (in the case of EAA) or poor adhesion (in the case of the ionomer) occurs. The results are the same following the two-months storage period.

Although the foregoing specific examples demonstrate the outstanding ability of the instant laminate webs to withstand the degenerative effects of a fluoride toothpaste and a household cement containing highly

TABLE ONE

| | Period (Weeks): | | | | | | | | | | | | | | |
|---|---|---|---|---|---|---|---|---|---|---|---|---|---|---|---|
| | 2 Weeks | | | 4 Weeks | | | 8 Weeks | | | 12 Weeks | | | 26 Weeks | | |
| | Temperature (°F.): | | | | | | | | | | | | | | |
| LAMINATE | 75 | 105 | 120 | 75 | 105 | 120 | 75 | 105 | 120 | 75 | 105 | 120 | 75 | 105 | 120 |
| A | — | — | G | — | G-E | F | G-E | F | P-F | G | F | — | G | P-F | — |
| B | — | — | G-E | — | G-E | G-E | G-E | G-E | F | G-E | G-E | — | G-E | F-G | — |
| C | — | — | G-E | — | G-E | G-E | G-E | G-E | G | G-E | G-E | — | G-E | G-E | — |

As used in the Table, the designations "E", "G", "F", and "P", mean that the condition of the web is judged to be excellent, good, fair, or poor, respectively; a dash mark indicates that no test is performed under the indicated conditions. To be considered excellent, the level of adhesion must be such that the polymer layer becomes stretched in endeavoring to separate it from the foil. Good adhesion indicates that separation is achieved and sustained only with difficulty. If the laminate offers a significant amount of resistance to separation it is deemed to be fair, and if it is easily delaminated the level of adhesion is regarded to be poor.

From Table One, it is seen that surprisingly high levels of bond strength are achieved utilizing the EAA film on the primed foil (laminates "B" and "C"), as compared to that which is exhibited when the laminated polymer is polyethylene (laminate "A"). More particularly, after storage for four weeks at 120° Fahrenheit, and 8 or 12 weeks at 105° Fahrenheit, the EAA-containin9 laminates both exhibit 9ood-to-excellent adhesion, whereas the polyethylene web has only fair bond stren9th. While these are the most dramatic differences reflected in Table One, it can be seen that in all instances the EAA laminates are invariably superior to those made with the low density polyethylene.

In addition to the foregoing delamination tests, environmental stress cracking of the three laminate webs is evaluated by hand squeezing selected pillows. After six months storage time at 105° Fahrenheit, the pillows produced from the polyethylene web are found to be highly prone to cracking when manually squeezed. In contrast, the EAA-based laminates, conditioned in the same way, satisfactorily survive such manipulation.

EXAMPLE TWO

A commercial household cement product (i.e., duPont DUCO cement) is sealed within pouches produced from laminates containing either 3.5 percent EAA or ionomer on aluminum foil, the polymer and foil gauges being 2.0 and 0.332 mil, respectively, in all cases.

active organic solvents, it should be appreciated that the instant webs can be used advantageously for the containment of a wide range of other products deemed to be difficult to hold. For example, the web of the invention can successfully survive the degenerative effects of NOXEMA Brushless Shave Cream (Noxell Corporation) Helena Rubenstein Skin Lightener, Dap, Inc. Waterless Hand Cleaner, VAGINEX Cream (Schmid Laboratories), Plymouth Citrus Products Industrial Waterless Hand Cleaner, TURTLE WAX Auto Polish Glaze, ARTRA Skin Tone Cream (Plough Inc.), Union Carbide Corporation car polish, ABSORBINE RUB (W. F. Young, Inc.) Red Glazing Putty (Oatey Co.), LX 845 Auto Glaze (Petrolite Corporation), and Soupletube (France) Product No. 3. As will be understood by those skilled in the art, while in all instances the degree of resistance to delamination is at a very good level, the specific results achieved with any particular product will, of course, vary. Moreover, it will be appreciated that the foregoing list of commercial products is intended only to be examplary, and that the laminate webs made in accordance with the concepts of the present invention may be utilized with comparable advantage for many other products, as well.

Thus, it can be seen that the present invention provides a novel laminate web comprised of aluminum foil and a layer of a copolymer of ethylene with an acrylic acid or acrylic acid ester monomer, which web is adapted for use to contain degenerative products for extended periods of time. The invention also provides a novel container and package fabricated from such a laminate web, and it provides novel methods for the production of such webs, containers and packages.

Having thus described the invention, what is claimed is:

1. A laminate web suitable for use in producing containers for degenerative products, comprising aluminum foil, a film of a copolymer of ethylene having in its molecule pendant carboxylic acid or ester groups, and at least a monomolecular layer of a polyacrylic acid chromium complex primer therebetween.

2. The web of claim 1 wherein said copolymer is selected from the group consisting of poly(ethylene/acrylic acid), poly(ethylene/methacrylic acid), poly(ethylene/methyl acrylate), poly(ethylene/methyl methacrylate), poly(ethylene/vinyl acetate), and ionomer.

3. The web of claim 1 wherein said web additionally includes a film of a synthetic resinous polymer upon the side of said foil opposite to that upon which said primer layer is applied.

4. A container for a degenerative product fabricated from the laminate web of claim 1, wherein said copolymer film is on the product side of said container.

5. A package comprised of the container of claim 4, said package including a degenerative product contained therewithin.

6. The package of claim 5 wherein said product is a dentifrice substance containing a fluoride anticaries agent.

7. The container of claim 6 wherein said laminate web is formed into a tubular configuration, and wherein said container additionally includes a headpiece secured to one end of said tubular structure.

8. The container of claim 7 wherein said headpiece is fabricated from high density polyethylene.

9. In a method for the production of a laminate web suitable for use in producing containers for degenerative products, the steps including: depositing upon at least one surface of an aluminum foil substrate at least a monomolecular layer of a polyacrylic acid chromium complex primer, as an aqueous alcoholic solution; heating said coated substrate to substantially dry said primer; extrusion coating a film of a copolymer of ethylene upon at least one of said primed surfaces of said foil, said copolymer having pendant carboxylic acid or ester groups in its molecule; and cooling the laminate to provide said web.

10. The method of claim 9 wherein said copolymer is selected from the group consisting of poly(ethylene/acrylic acid) and ionomer resin.

11. The method of claim 10 wherein said copolymer is poly(ethylene/acrylic acid), and wherein said copolymer exits from the extrusion dye at a melt temperature of about 550° to 600° Fahrenheit.

12. The method of claim 11 wherein said melt temperature is about 575° to 590° Fahrenheit.

13. In a method for the production of a container for a degenerative product, the steps comprising; depositing upon at least one surface of an aluminum foil substrate at least a monomolecular layer of a polyacrylic acid chromium complex primer, as an aqueous alcoholic solution; heating said coated substrate to substantially dry said primer; extrusion coating at a melt temperature of about 550° to 600° Fahrenheit, a film of a copolymer of ethylene upon at least one of said primed surfaces of said foil, said copolymer having pendant carboxylic acid or ester groups in its molecule; cooling the resultant laminate to provide a web; and forming said web into a container configuration with said copolymer film disposed on the inside thereof.

14. The method of claim 13 wherein said web is formed into a tubular structure, and wherein said method additionally includes the step of bonding a headpiece to said web at one end of said tubular structure formed therefrom, said melt temperature being about 575° to 590° Fahrenheit.

15. The method of claim 14 wherein said headpiece is fabricated from high density polyethylene.

16. In a packaging method, the steps comprising: forming the container of claim 13, and filling said container with a degenerative product.

17. The packaging method of claim 16 wherein said product is a dentifrice substance containing a fluoride anticaries agent.

* * * * *